US008381446B2

(12) United States Patent
Trevarrow

(10) Patent No.: US 8,381,446 B2
(45) Date of Patent: Feb. 26, 2013

(54) DEVICE FOR CONNECTING A WINDOW PANE TO A MOTOR VEHICLE WINDOW LIFTER

(75) Inventor: James Trevarrow, Lake Orion, MI (US)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 34 days.

(21) Appl. No.: 13/074,383

(22) Filed: Mar. 29, 2011

(65) Prior Publication Data

US 2012/0247020 A1 Oct. 4, 2012

(51) Int. Cl.
*B60J 1/16* (2006.01)

(52) U.S. Cl. ........................................................ 49/375

(58) Field of Classification Search .................... 49/372, 49/374, 375

See application file for complete search history.

(56) References Cited

U.S. PATENT DOCUMENTS

| | | | | |
|---|---|---|---|---|
| 5,809,695 | A * | 9/1998 | Strickland | 49/352 |
| 5,864,987 | A * | 2/1999 | Mariel et al. | 49/352 |
| 6,205,711 | B1 * | 3/2001 | Klippert | 49/375 |
| 6,233,873 | B1 * | 5/2001 | Lawrie et al. | 49/375 |
| 6,519,898 | B2 * | 2/2003 | Tatsumi et al. | 49/375 |
| 6,598,345 | B1 * | 7/2003 | Arimoto et al. | 49/374 |
| 6,729,073 | B2 * | 5/2004 | Nicolai | 49/375 |
| 6,854,213 | B2 * | 2/2005 | Galliani | 49/375 |
| 7,802,401 | B2 * | 9/2010 | Wild et al. | 49/375 |
| 7,908,795 | B2 * | 3/2011 | Arimoto | 49/375 |
| 2003/0066244 | A1 * | 4/2003 | Staser et al. | 49/375 |
| 2005/0072051 | A1 * | 4/2005 | Pound et al. | 49/375 |
| 2005/0160675 | A1 * | 7/2005 | Fenelon | 49/375 |

FOREIGN PATENT DOCUMENTS

JP 06135228 A 5/1994

* cited by examiner

*Primary Examiner* — Jerry Redman
(74) *Attorney, Agent, or Firm* — Christie, Parker & Hale, LLP

(57) ABSTRACT

A device for connecting a window pane to a motor vehicle window lifter, said device includes a follower having a basic follower body connected to guide and transport means of the window lifter and a coupling follower body which is to be connected to a pane socket connected to the window pane, a coupling portion of the pane socket being attached to a fastening means in a mounting direction for connecting the pane socket to the follower. The fastening means is pre-installed to the coupling follower body and by actuating the fastening means the coupling portion of the pane socket is braced to the coupling follower body.

17 Claims, 6 Drawing Sheets

DEVICE FOR CONNECTING A WINDOW PANE TO A MOTOR VEHICLE WINDOW LIFTER

FIELD OF THE INVENTION

The invention relates to a device for connecting a window pane to a motor vehicle window lifter.

BACKGROUND OF THE INVENTION

From JP 6 135228 a device is known for connecting a motor vehicle window pane to a window lifter wherein the lower edge of the window pane is connected to two pane sockets which each have two spaced webs with a wedge shaped tip. Two clip-like followers connected to a window lifter device have an inclined lead-in area and an undercut hollow cavity for holding with keyed engagement the wedge-shaped tips of the pane sockets connected to the window pane. As a result of the only slight keyed engagement between the wedge-shaped tips and the undercut hollow cavity, in order to secure the connection between the pane sockets and the followers a bore is provided penetrating through the arms of each follower to house a screw connection with which the arms of the followers are tensioned so that the position of the wedge-shaped tips of the pane sockets in the followers is secured.

With this known device for connecting a motor vehicle window pane to the followers of a window lifter it is necessary to align the positive locking elements of the pane sockets and the followers precisely relative to each other and in addition to tension the followers with force-locking engagement to secure the connection between the pane sockets and followers, which in turn necessitates a visual contact with the connecting means and access to the followers during assembly. Connecting the window pane to the window lifter therefore requires an open door shaft and a longer assembly time which leads to considerable costs during assembly.

Another of the disadvantages of the known device for connecting a window pane to a motor vehicle window lifter is that for connecting the pane socket and the follower requires that a loose fastener is inserted through the vehicle door or module opening for attachment between the pane socket and the follower. This results in a potential for the fastener to be dropped into the door or mis-installed resulting in operating noise and customer dissatisfaction.

SUMMARY OF THE INVENTION

It is an object of the present invention to provide a device for connecting a window pane to a motor vehicle window lifter which allows blind fitting, guarantees a secure connection between the window pane and window lifter and an easy assembly without the potential for the fastening means to be dropped into the door or being mis-installed resulting in operating noise and customer dissatisfaction.

According to the present invention, the device for connecting a window pane to a motor vehicle window lifter comprises

- a follower comprising a basic follower body connected to guide and transport means of said window lifter and a coupling follower body which is to be connected to a pane socket connected to said window pane,
- a coupling portion of said pane socket being attached to a fastening means connected to said coupling follower body in a mounting direction for connecting said pane socket to said follower,

- said fastening means bracing said coupling portion of said pane socket and said coupling body.

The solution according to the present invention ensures simple fitting and allows a blind fitting without visual contact of the connecting elements when connecting the window pane to a motor vehicle window lifter, for example in the case of a closed door shaft of a motor vehicle door. It ensures a secure connection between the window pane and the motor vehicle window lifter and an easy assembly without the potential for the fastening means to be dropped into the door or being mis-installed resulting in operating noise and customer dissatisfaction.

The solution according to the present invention is based upon a pre-installation of the fastening means on the coupling follower body which is connected to a part of a basic follower body of the follower. By attaching a coupling portion of a pane socket to the fastening means pre-installed to the coupling follower body in a mounting direction for connection said pane socket to said follower a loose form-locking or keyed connection between the pane socket and the follower is achieved and thereinafter by actuating the fastening means the coupling portion of the pane socket is braced to said coupling follower body.

The form-locking connection between the pane socket and the follower in a first assembly step allows a blind fitting even in the absence of a visual contact with the fastening means and the coupling portion of the pane socket. By actuating the fastening means in a second assembly step the coupling portion of the pane socket is firmly connected to the coupling follower body and braced between the coupling following body and the fastening means.

Preferably, the fastening means is adjustable in a direction perpendicular to the mounting direction for connecting the pane socket to the follower whereby the fastening means comprises a pre-started fastening bolt connected to and perpendicularly protruding from said coupling follower body, said fastening bolt having a threaded shank and a bolt head. In particular the bolt head comprises a disc-like enlargement for a large fastening area.

The fastening means is designed as a fastening bolt which perpendicularly protrudes from the coupling follower body with the threaded shank being pre-installed to the coupling follower body prior to the installation of the pane socket to the coupling follower body. This prevents both a separate installation of the fastening means for connecting the pane socket to the follower during the assembly and the danger for the fastening means to be dropped into the door or being mis-installed.

Preferably the coupling portion of said pane socket comprises a longitudinal slot aligned to said mounting direction for connecting said pane socket to said follower. The longitudinal slot is attachable to the threaded shank and allows a simple alignment and form locking connection of the pane socket to the follower such that in a second assembly step the coupling portion of the pane socket is braced between the coupling follower body and the bolt head of the fastening bolt.

For frictionally fitting the coupling portion of the pane socket between the coupling follower body and the bolt head of the fastening bolt, the coupling follower body comprises an internal thread which is engaged by an external thread of the threaded shank whereby the internal thread is preferably arranged in an insert fastener which is inserted into the coupling follower body.

The interaction of the internal thread of the coupling follower body and the external thread of the threaded shank allows a screw connection for frictionally connecting the coupling portion of the pane socket between the coupling follower body and the bolt head by means of a pre-determined friction force for a safe connection between the pane socket and the follower. Preferably the disc-like enlargement of the bolt head comprises a textured surface facing the coupling portion to prevent an undesired rotation of the fastening bolt after having connected the pane socket to the coupling follower body by means of the fastening bolt.

The internal thread is preferably arranged in an insert fastener which is moulded into the coupling follower body, eliminating a torque fall off due to heat creep and ensuring a firm force-locking connection between the pane socket and the follower.

As an alternative to a screw connection, a different type of force-locking connection can be provided such a turned buckle, locking device or the like.

To provide a force-locking connection between the pane socket and the follower, the bolt head can be designed to receive a tool for screwing the external thread of the threaded shank into the internal thread of the coupling follower body or the insert fastener moulded into the coupling follower body whereby a washer may be provided between the bolt head and the coupling portion of the pane socket.

Preferably, the coupling follower body may be designed as a flange portion laterally protruding from the basic follower body whereby the basic follower body comprises an isolation bumper receiving a lower edge of the window pane when the follower and the pane socket are brought together.

Through this assignment of the coupling follower body, the bottom of the window pane shaft and the lower edge of the window pane a safe, tilt-free arrangement of the window pane is ensured whereby the isolation bumper is used to prevent tensions and noises between the window pane and the follower.

The coupling portion of the pane socket is preferably an extension of the first side wall of the pane socket whereby the first side wall and a second side wall form a window pane shaft for receiving the window pane whereby the bottom wall of the window pane shaft is supported by an upper edge of the coupling follower body when the follower and the pane socket are brought together such that handling becomes easier during assembly and the position and orientation of the pane socket is secured.

To facilitate the assembly of the coupling portion and the coupling follower body a bottom edge of the coupling portion of the pane socket comprises a let-in angle for connecting the longitudinal slot of said coupling portion and said pre-started fastening bolt connected to the coupling follower body. In particular lead-in angles are provided on both sides of the longitudinal slot which is perpendicularly aligned to the bottom edge of said coupling portion.

To ensure a safe connection between the pane socket and the follower even in case of a torque fall-off of the fastening means a sash hook is formed between said bottom edge of the coupling portion and the let-in angle, whereby the sash hook faces or joins a bottom edge of said coupling follower body when said follower and said pane socket are brought together.

The pane socket may be either designed as a roll formed sash or as a plastic sash.

Especially in case of designing the pane socket as a plastic sash a metal insert for receiving the fastening bolt is arranged in at least a portion of the coupling portion of the pane socket, in particular in a region of said longitudinal slot of said coupling portion for receiving said fastening bolt, such that the metal insert is braced between the disc-like enlargement of the bolt head and the coupling portion of the pane socket to prevent a torque fall off of the connection between the coupling portion of the pane socket and the coupling follower body.

BRIEF DESCRIPTION OF THE DRAWINGS

The idea on which the invention is based will now be explained in further detail with reference to the embodiments shown in the drawings in which.

DETAILED DESCRIPTION

Figure 2:
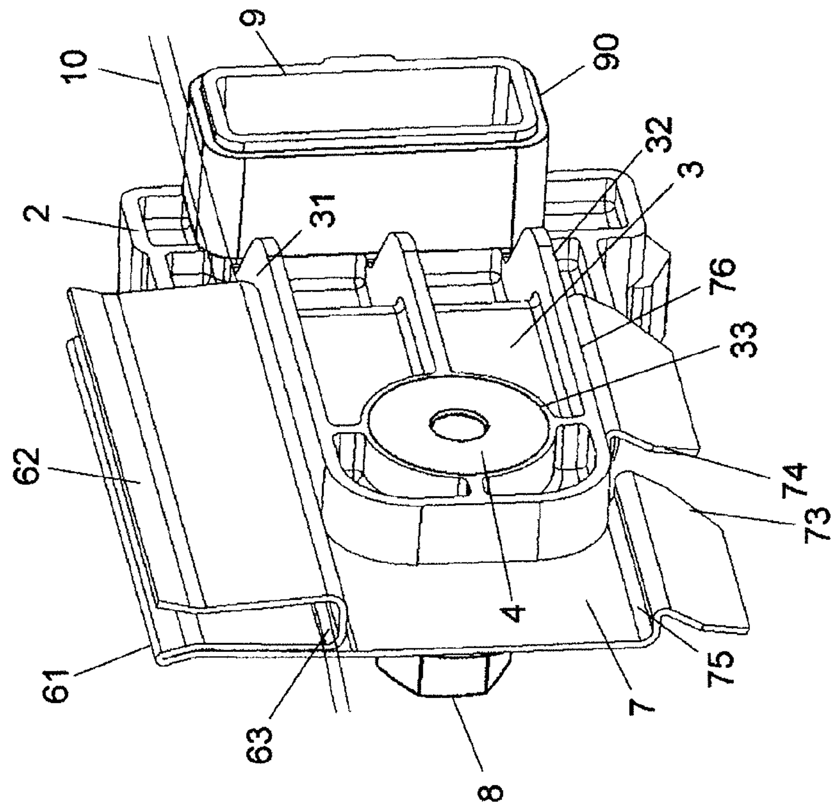
FIGS. 1 and 2 are diagrammatic perspective views of a follower and a pane socket to be connected to the follower.
Figure 1:
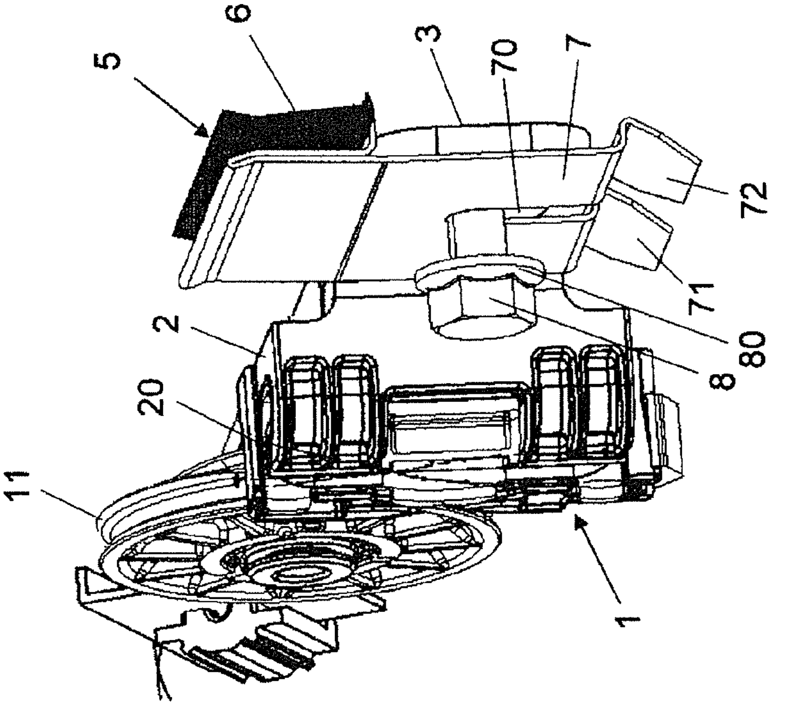
Figure 8:
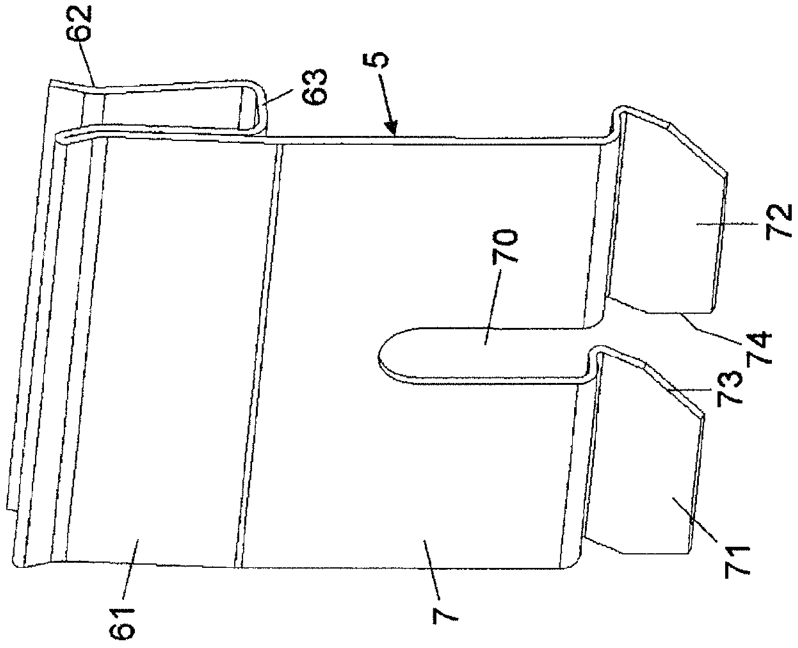
FIG. 8 an isolated diagrammatic perspective view of a roll formed coupling portion.
Figure 7:
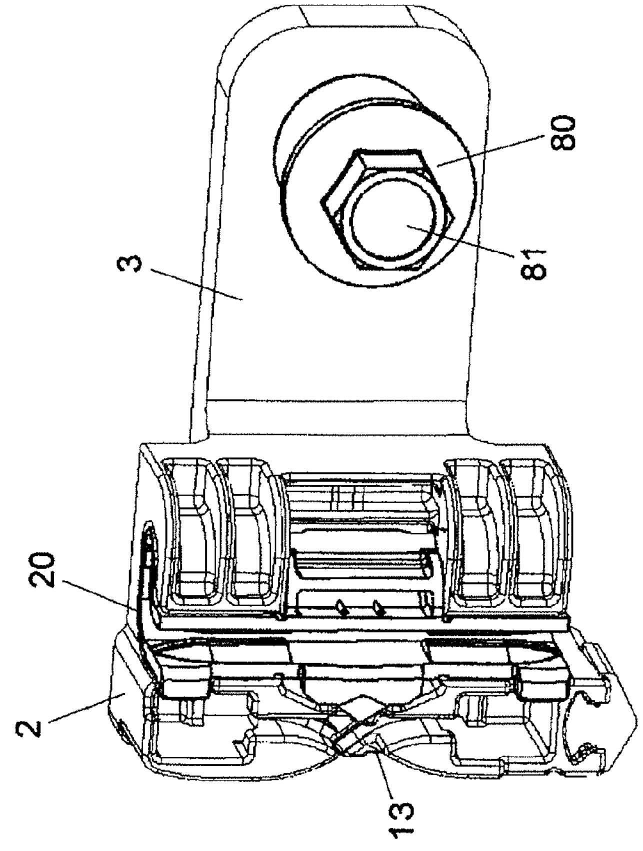
FIG. 7 an isolated diagrammatic perspective view of the follower and the fastening means inserted into the coupling follower body.

FIGS. 1 and 2 show different perspective views of a follower 1 and a roll formed pane socket 5 for connecting a window pane 10 and a motor vehicle window lifter in an assembled state and in FIGS. 7 and 8 separated from one another. The window pane 10 is inserted into a pane shaft 6 which comprises two spaced apart side walls 61, 62 and a bottom 63. The window pane 10 is additionally fastened to the pane socket 5 by means of gluing or by other form-locking or force-locking connection means.

The follower 1 comprises a basic follower body 2 and a coupling follower body 3, which is designed as a flange portion protruding from the basic follower body 2 and comprises an upper edge 31 and a lower edge 32. The basic follower body 2 is connected to a guide rail 12 of the motor vehicle window lifter via a guide slot 20 illustrated in FIG. 9 and comprises a cable mounting 13 as shown in FIG. 7 in which a window lifter cable is inserted for upward and downward movement of the follower 1 and the window pane 10, respectively.

The coupling follower body 3 to be connected to the pane socket 5 comprises a contact bearing face 30 and a bore or recess 33 for receiving an insert fastener 4 comprising an internal thread 40. The external thread of a threaded shank 82 of a fastening bolt 8 having a hexagonal bolt head 81 engages the internal thread 40 of the coupling follower body 3 or the insert 4 in the coupling follower body 3. The bolt head 81 is provided with a disc-like enlargement 80 for a large fastening area, the surface of the disc-like enlargement 80 facing the coupling portion 7 comprises a textured surface, in particular a knurled surface, to prevent an undesired rotation of the fastening bolt 8 after having connected the pane socket 5 to the coupling follower body 3 by means of the fastening bolt 8.

The pane socket 5 comprises a coupling portion 7 which is designed as an extension of the side wall 61 of the window pane shaft 6 and includes a longitudinal slot 70, slightly wider than the threaded shank 82 of the fastening bolt 8. At the opposite end of the window pane shaft 6 the coupling portion 7 of the pane socket 5 is provided with two lead-in angles 71, 72 which are arranged at both sides of the longitudinal slot 70. The lead-in angles 71, 72 are arranged at sash hooks 75, 76 which protrude from the coupling portion 7 at substantially right angles running in an oblique angle to the coupling portion 7. Lead-in edges 73, 74 of the lead-in angles 71, 72 at both sides of the longitudinal slot 70 are also tapered such that the ends of the lead-in angles 71, 72 have a greater distance from one another as the side edges of the longitudinal slot 70.

An isolation bumper 9 having an essentially rectangular shape and an attenuator 90 in the form of plastic or rubber as an outer surface is connected to the basic follower body 2. In the assembled state of the follower 1 and the pane socket 5 the window pane 10 inserted into the window pane shaft 6 contacts the attenuator 90 of the isolation bumper 9, thereby preventing a direct contact between the window pane 10 and the follower 1.

FIGS. 1 and 2 show the follower 1 and the pane socket 5 in an intermediate position of the assembly in which the longitudinal slot 70 is mounted on the threaded shank 82 of the pre-started fastening bolt 8 which has been previously connected to the coupling follower body 3 by screwing the external thread of the threaded shank 82 into the internal thread 40 of the insert fastener 4 of the coupling follower body 3.

Figure 4:
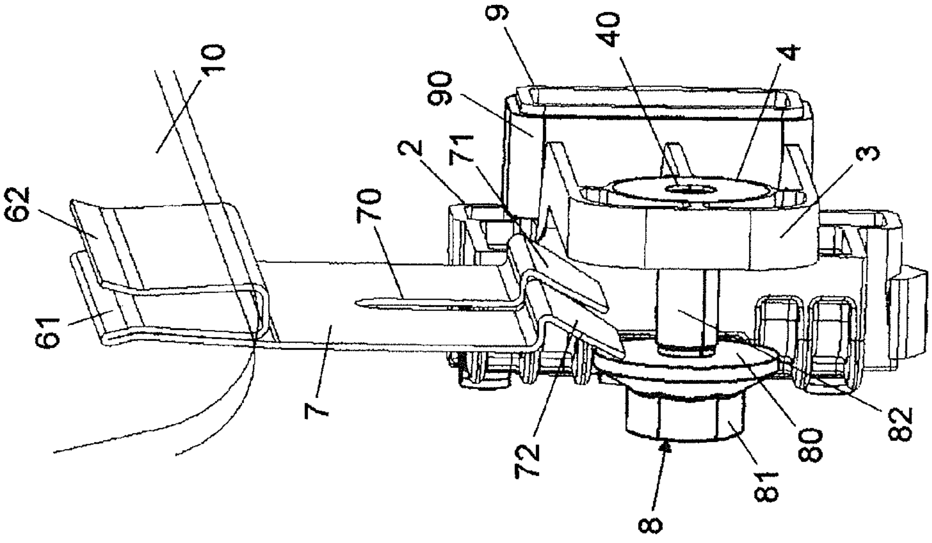
FIGS. 3 and 4 are diagrammatic perspective views of the follower and the pane socket during a first step of assembly.
Figure 3:
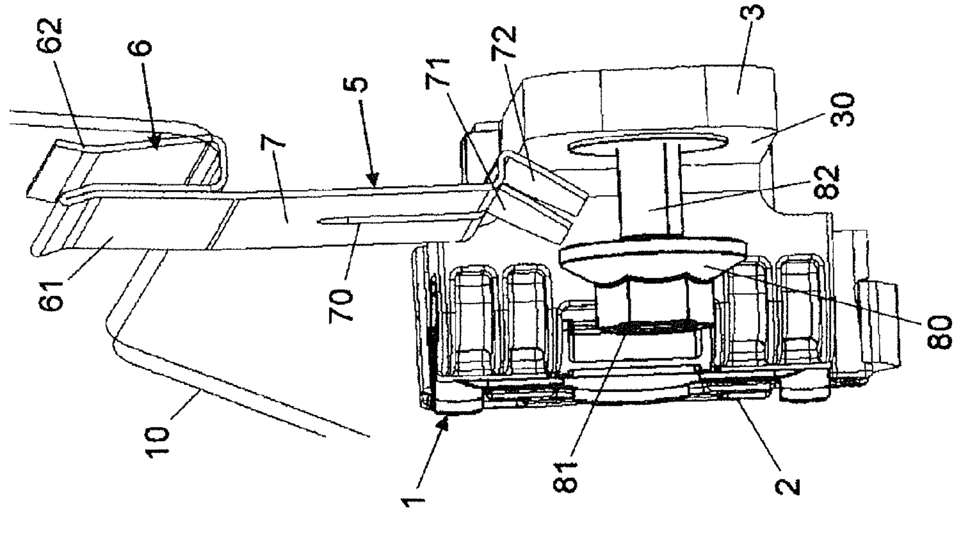

FIGS. 3 and 4 show in different perspective views the fastening bolt 8 connected to the coupling follower body 3 by screwing the external thread of the screw shaft 82 in the internal thread 40 of the insert fastener 4 in the coupling follower body 3 and the pane socket 5 receiving the window pane 10 in its window pane shaft 6 which may be inserted through an upper slot into a motor vehicle door shaft. The threaded shank 82 of the fastening bolt 8 is screwed into the internal thread 40 of the insert fastener 4 as far as a safe connection is ensured between the coupling follower body 3 and the fastening bolt 8, but leaving a reasonable distance for inserting the coupling portion 7 of the pane socket 5 between the disc-like enlargement 80 of the bolt head 81 on one side and the contact bearing face 30 of the coupling follower body 3 on the other side.

The pane socket 5 with its coupling portion 7 is moved forward in the direction of the fastening bolt 8, whereby according to FIG. 2 the lead-in angles 71, 72 and the lead-in edges 73, 74 facilitate the threading of the longitudinal slot 70 on the threaded shank 82 and thus bringing the coupling portion 7 in the corresponding position for a connection to the coupling follower body 3.

After plugging the longitudinal slot 70 of the pane socket 5 on the threaded shank 82 of the fastening bolt 8 in accordance with the intermediate assembling position illustrated in FIGS. 1 and 2, the fastening bolt 8 is screwed into the internal thread 40 of the insert fastener 4 by means of a tool, for example by means of a hexagonal wrench for socket head cap screws, connected to the bolt head 81 until the coupling portion 7 is clamped or braced between the contact bearing face 30 of the coupling follower body 3 and the disc-like enlargement 80 of the bolt head 81, respectively. By applying an appropriate torque to the fastening bolt 8 the clamping force for bracing the coupling portion 7 between the coupling follower body 3 and the disc-like enlargement 80 of the bolt head 81 is determined.

To prevent an undesired rotation of the fastening bolt 8 after having connected the pane socket 5 to the coupling follower body 3 by means of the fastening bolt 8 the disc-like enlargement 80 of the bolt head 81 comprises a textured surface facing the coupling portion 7.

The special design of the lead-in angles 71, 72 comprising the sash hooks 75, 76 protruding substantially vertically from the plane of the coupling portion 7 as described in connection with FIGS. 1 and 2 effects that even an insufficient torque for bracing the coupling portion 7 of the pane socket 5 between the coupling follower body 3 and the washer 80 or the bolt head 81, respectively, does not result in a separation of the coupling portion 7 of the pane socket 5 from the coupling follower body 3, because the sash hooks 75, for example when lowering the window pane 10, contact the lower edge 32 of the coupling follower body 3, thereby preventing sliding out of the longitudinal slot 70 from the connection with the threaded shank 82 of the fastening bolt 8.

Figure 6:
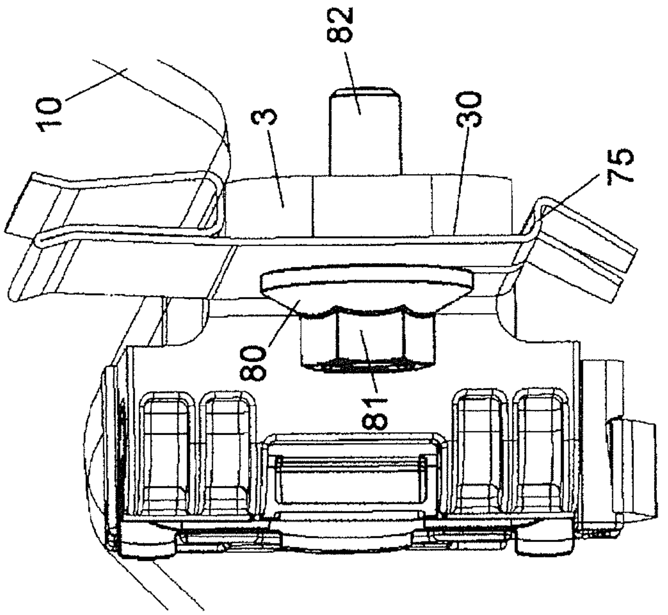
FIG. 6 a diagrammatic perspective view of the pane socket connected to the follower.
Figure 5:
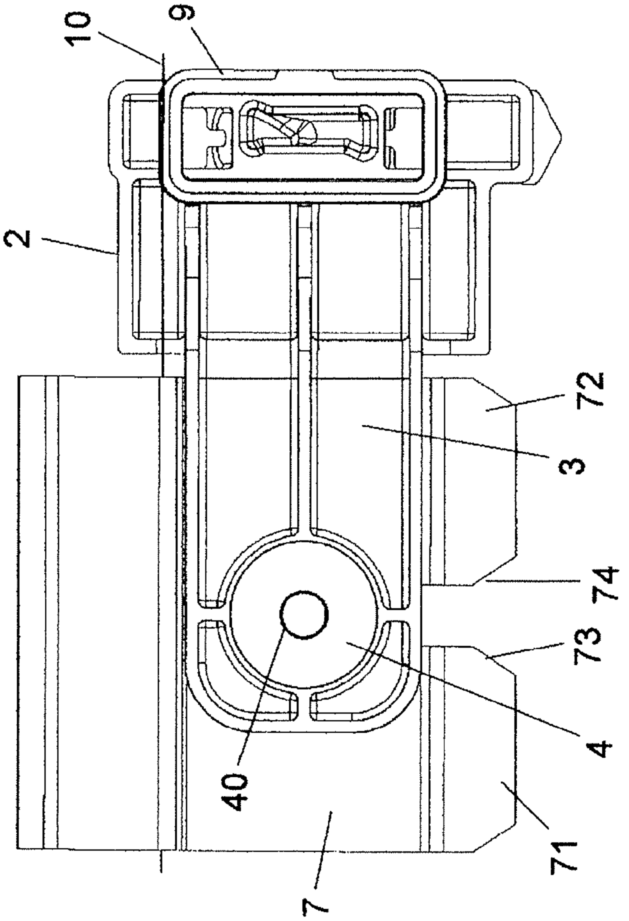
FIG. 5 a side view of the pane socket connected to the follower.

The pane socket 5 braced to the follower 1 by force-locking connection after tightening of the fastening bolt 8 is shown in FIG. 5 in a rear side view and in FIG. 6 in a perspective view. Both figures show the alignment of the lower edge of the window pane 10 by the isolation bumper 9 with respect to the cable connection or nipple chamber in the basic follower body 2.

Figure 11:
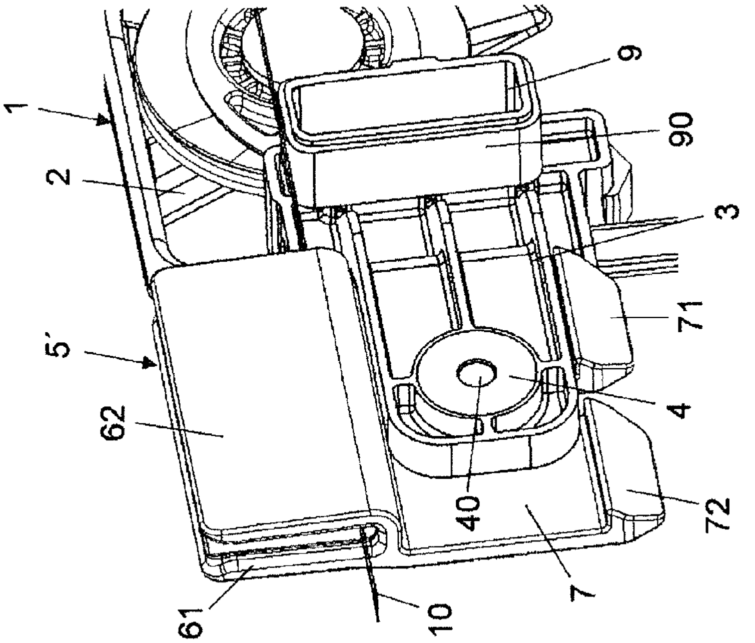
FIG. 11 a diagrammatic perspective rear side view of the pane socket connected to the follower.
Figure 10:
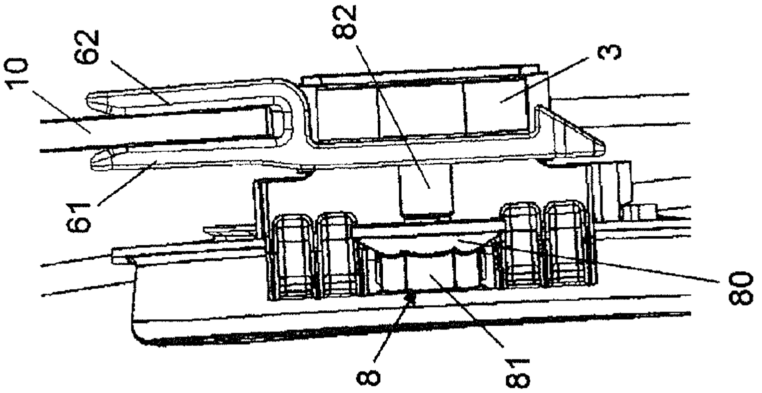
FIG. 10 a longitudinal side view of the follower and the pane socket in the first step of assembly according to FIG. 9.
Figure 9:
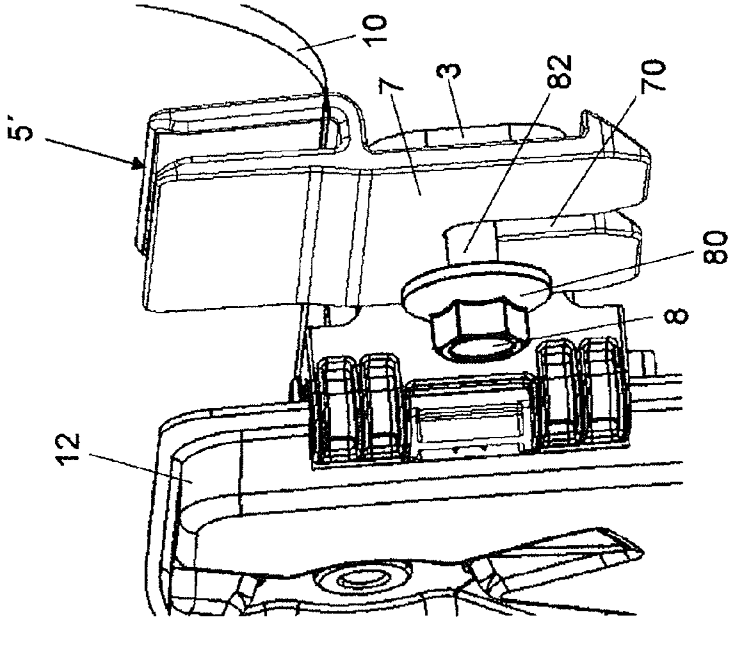
FIG. 9 a diagrammatic perspective view of the follower and a plastic pane socket during a first step of assembly.
Figure 15:
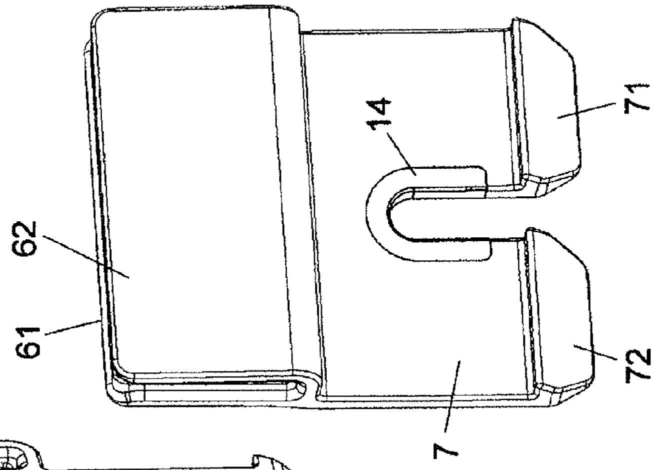
Figure 14:
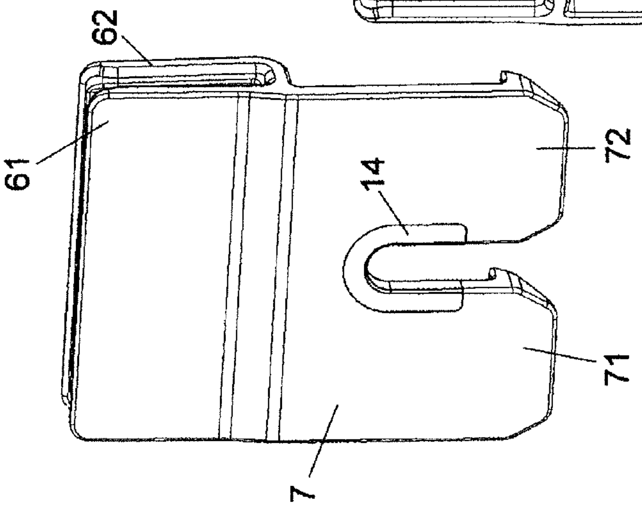
Figure 13:
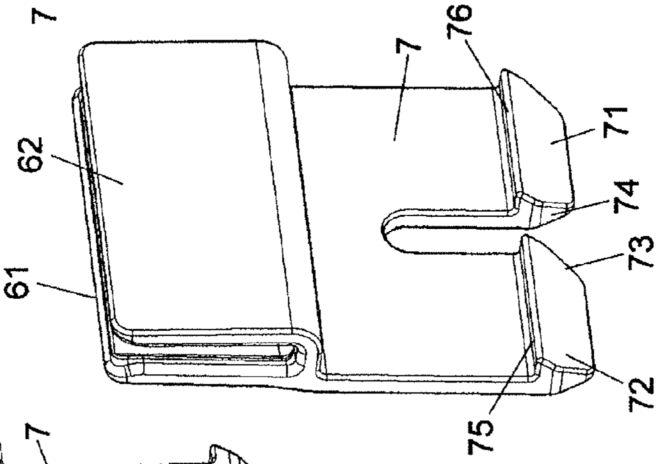
FIGS. 12 and 13 isolated diagrammatic perspective views of a plastic pane socket and FIGS. 14 and 15 isolated diagrammatic perspective views of the plastic pane socket provided with a metal insert in the longitudinal slot of the coupling portion.
Figure 12:
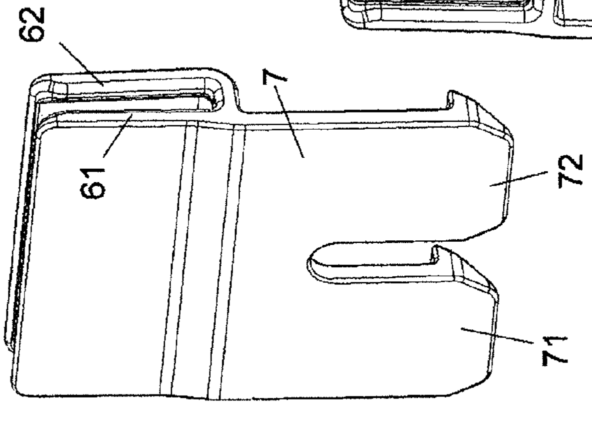

FIGS. 9 to 11 show a second embodiment of a connection of a pane socket 5' and a follower 1, which differs from the first embodiment depicted in FIGS. 1 to 8 and described above only to the extent that the pane socket 5' is not designed as a roll formed sash as in the first embodiment according to FIGS. 1 to 8 but as a plastic injection molded part while all other components of the device match with the above-described first embodiment using the same reference numerals, such that reference is made to the above description of to the shape, assembly and function of the follower 1 and the pane socket 5.

To prevent that the coupling portion 7 is insufficiently braced between the coupling follower body 3 and the disc-like enlargement 80 of the bolt head 81 due to a drop in torque during the force-locking connection of the coupling portion 7 and the coupling follower body 3 a metal insert 14 is provided at the end portion of the longitudinal slot 70 covering the area where the bolt head 81 or washer 80 contacts the coupling portion 7 of the pane socket 5'.

Reference Numbers
1 follower 1
2 basic follower body
3 coupling follower body
4 insert fastener
5, 5' pane socket
6 window pane shaft
7 coupling portion
8 fastening bolt
9 isolation bumper
10 window pane
11 guide roller
12 guide rail
13 cable mounting
14 metal insert
20 guide slot
30 contact bearing face
31 upper edge
32 Lower edge
33 bore or recess
40 internal thread
61, 62 side wall
63 bottom wall

70 longitudinal slot
71, 72 lead-in angle
73, 74 lead-in edge
75, 76 sash hook
80 washer
81 bolt head
82 threaded shank
90 attenuator

What is claimed is:

1. A device for connecting a window pane to a motor vehicle window lifter, said device comprising:

a follower comprising a main follower body connected to said window lifter and a coupling follower body which is connected to a pane socket connected to said window pane, a coupling portion of said pane socket being attached to a fastener connected to said coupling follower body in a mounting direction for connecting said pane socket to said follower, said fastener interlocking said coupling portion of said pane socket and said coupling follower body, said fastener comprising a pre-started fastening bolt connected to and perpendicularly protruding from said coupling follower body, said fastening bolt having a shaft and a bolt head, said coupling portion of said pane socket comprising a longitudinal slot aligned in said mounting direction for connecting said pane socket to said follower, said longitudinal slot being attachable to a bolt shaft of said fastening bolt, a bottom edge of said coupling portion of said pane socket comprising a lead-in angle for connecting said longitudinal slot of said coupling portion with said fastener connected to said coupling follower body, and a sash hook being located between said bottom edge of said coupling portion and said lead-in angle, said sash hook facing or joining a bottom edge of said coupling follower body when said follower and said pane socket are coupled together.

2. The device according to claim 1, wherein said fastener is adjustable in a direction perpendicular to said mounting direction for connecting said pane socket to said follower.

3. The device according to claim 1, wherein said fastener comprises an internal thread being in said coupling follower body, said internal thread being engaged by an external thread of said threaded shank.

4. The device according to claim 3, wherein said internal thread is in an insert fastener being inserted into said coupling follower body of said follower.

5. The device according to claim 1, wherein said bolt head is designed for screwing said fastening bolt into said internal thread of said coupling follower body.

6. The device according to claim 1, wherein a washer is located between said bolt head and said coupling portion of said pane socket.

7. The device according to claim 1, wherein said coupling portion is configured to be frictionally connected to said coupling follower body and to said bolt head by adjustment of said fastening bolt.

8. The device according to claim 1, wherein said main follower body comprises an isolation bumper receiving a lower edge of said window pane when said follower and said pane socket are coupled together.

9. The device according to claim 1, wherein said coupling follower body has a flange portion which laterally projects from said main follower body.

10. The device according to claim 1, wherein said coupling portion is an extension of a first side wall of said pane socket, said first side wall and a second side wall forming a window pane shaft for receiving said window pane.

11. The device according to claim 10, wherein a bottom wall of said window pane shaft is supported by an upper edge of said coupling follower body when said follower and said pane socket are coupled together.

12. The device according to claim 1, wherein lead-in angles are provided on both sides of said longitudinal slot which is perpendicularly aligned to the bottom edge of said coupling portion.

13. The device according to claim 1, wherein said pane socket is a roll formed sash.

14. The device according to claim 1, wherein said pane socket is a plastic sash.

15. The device according to claim 14, wherein a metal insert is arranged in at least a portion of said coupling portion of said pane socket and wherein said metal insert is braced between a washer of said fastener and said coupling portion of said pane socket.

16. The device according to claim 15, wherein said metal insert is located in said longitudinal slot of said coupling portion for receiving said fastener.

17. The device according to claim 15, wherein said washer of said fastener comprises a textured surface facing said coupling portion.

* * * * *